(12) United States Patent
Driver et al.

(10) Patent No.: US 8,038,913 B2
(45) Date of Patent: Oct. 18, 2011

(54) INSTALLATION OF CURED IN PLACE LINERS WITH DUAL GLAND AIR INVERSION AND STEAM CURE APPARATUS

(75) Inventors: Franklin Thomas Driver, Chesterfield, MO (US); Steve J. Hirtz, Foristell, MO (US); Richard C. Polivka, Lemont, IL (US); James H. Blasczyk, Friendswood, TX (US); Neil T. Birchler, St. Peters, MO (US); Kyle M. Costa, Wentzville, MO (US)

(73) Assignee: INA Acquisition Corp., Wilmington, DE (US)

( * ) Notice: Subject to any disclaimer, the term of this patent is extended or adjusted under 35 U.S.C. 154(b) by 4 days.

(21) Appl. No.: 12/401,810

(22) Filed: Mar. 11, 2009

(65) Prior Publication Data

US 2009/0165927 A1 Jul. 2, 2009

Related U.S. Application Data

(62) Division of application No. 11/504,909, filed on Aug. 16, 2006.

(60) Provisional application No. 60/708,934, filed on Aug. 17, 2005.

(51) Int. Cl.
*B29C 73/00* (2006.01)
(52) U.S. Cl. ....... 264/36.17; 425/11; 138/98; 405/184.2
(58) Field of Classification Search ............... 264/36.17; 425/11; 138/98; 405/184.2
See application file for complete search history.

(56) References Cited

U.S. PATENT DOCUMENTS

| 4,368,091 A | 1/1983 | Ontsuga et al. |
| 4,385,885 A | 5/1983 | Wood |
| 4,685,983 A | 8/1987 | Long, Jr. |
| 5,223,204 A | 6/1993 | Endoh |

(Continued)

FOREIGN PATENT DOCUMENTS

GB 1044645 10/1966

(Continued)

OTHER PUBLICATIONS

Office action issued Feb. 23, 2009 in related U.S. Appl. No. 11/504,909, 14 pgs.

(Continued)

*Primary Examiner* — Yogendra Gupta
*Assistant Examiner* — Amjad Abraham
(74) *Attorney, Agent, or Firm* — Senniger Powers LLP

(57) ABSTRACT

Installation of a flexible cured in place liner by inverting the liner with air and curing the liner with steam introduced through a perforated lay flat hose without deflating the liner between the inversion and cure. The installation is performed with an apparatus having two independently operable glands with at least one fluid inlet port installed on the line downstream of the second gland liner. As the liner reaches the distal end of the conduit to be lined, it enters a sample and porting pipe with an exhaust pipe gland and exhaust pipe and it is pierced by a rigid porting tool. Steam is then introduced into the lay flat hose to cure the resin and is exhausted through an exhaust hose connected to a controllable exhaust pipe. After curing steam is replaced with air to cool the liner, the ends are cut to restore service through the host pipe.

15 Claims, 16 Drawing Sheets

U.S. PATENT DOCUMENTS

| | | | |
|---|---|---|---|
| 5,358,359 A * | 10/1994 | Long, Jr. | 405/184.2 |
| 5,374,174 A | 12/1994 | Long, Jr. | |
| 5,486,332 A | 1/1996 | Kamiyama et al. | |
| 5,520,484 A | 5/1996 | Kamiyama et al. | |
| 5,597,353 A | 1/1997 | Alexander, Jr. | |
| RE35,944 E | 11/1998 | Driver et al. | |
| 6,093,363 A | 7/2000 | Polivka | |
| 6,354,330 B1 * | 3/2002 | Wood | 138/97 |
| 6,390,795 B1 * | 5/2002 | Waring et al. | 425/11 |
| 6,708,728 B2 | 3/2004 | Driver et al. | |
| 6,960,313 B2 | 11/2005 | Waring et al. | |
| 7,360,559 B2 | 4/2008 | Driver et al. | |
| 7,476,348 B2 | 1/2009 | Waring | |
| 2004/0020544 A1 | 2/2004 | Kamiyama et al. | |
| 2006/0137816 A1 * | 6/2006 | Taylor et al. | 156/294 |
| 2007/0029688 A1 | 2/2007 | Delaney et al. | |

FOREIGN PATENT DOCUMENTS

| | | |
|---|---|---|
| WO | WO 92/14961 | 9/1992 |
| WO | 0235136 A1 | 5/2002 |
| WO | WO 0235136 A1 * | 5/2002 |

OTHER PUBLICATIONS

Response filed Aug. 20, 2009 to Office Action dated Feb. 23, 2009 from related U.S. Appl. No. 11/504,909, 12 pgs.

Office action issued Jan. 15, 2010 in related U.S. Appl. No. 11/504,909, 13 pgs.

Office action issued May 26, 2010 in related U.S. Appl. No. 11/504,909, 9 pgs.

Response filed Aug. 26, 2010 to Office Action dated May 26, 2010 from related U.S. Appl. No. 11/504,909, 9 pgs.

Office action issued Nov. 26, 2010 in related U.S. Appl. No. 11/504,909. 12 pages.

Office action issued Apr. 14, 2011 in related U.S. Appl. No. 11/504,909. 12 pgs.

Response filed Feb. 28, 2011 to Office Action dated Nov. 26, 2010 from related U.S. Appl. No. 11/504,909. 7 pgs.

* cited by examiner

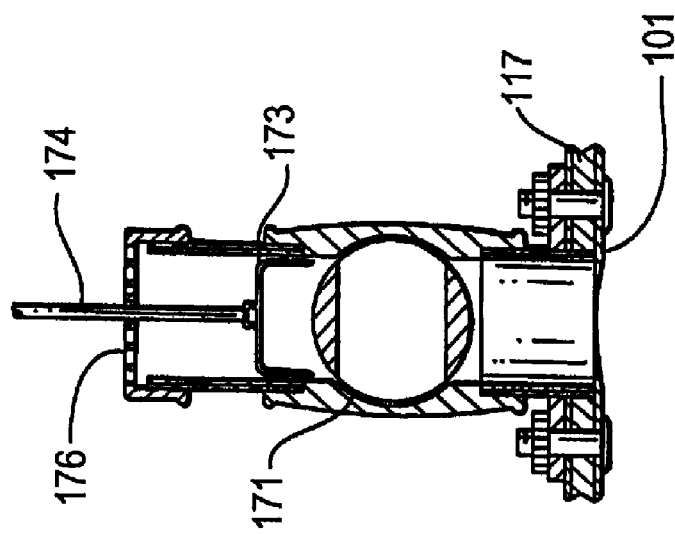
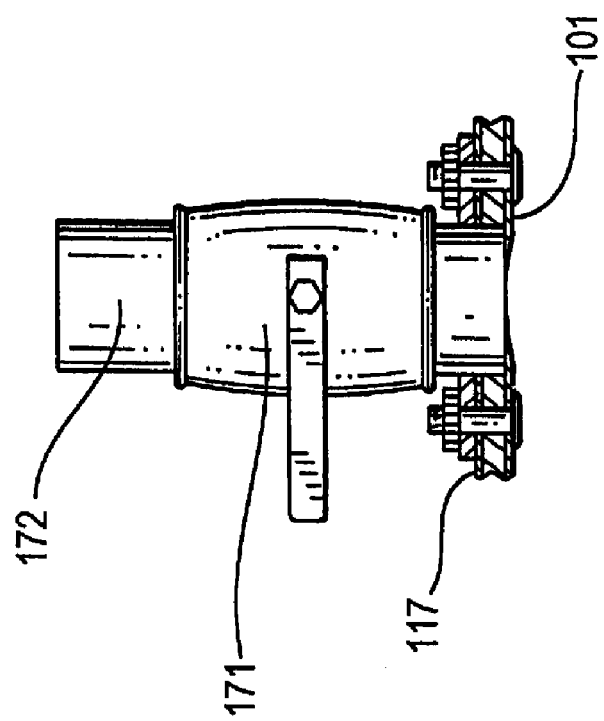
FIG. 11(b)
FIG. 11(a)

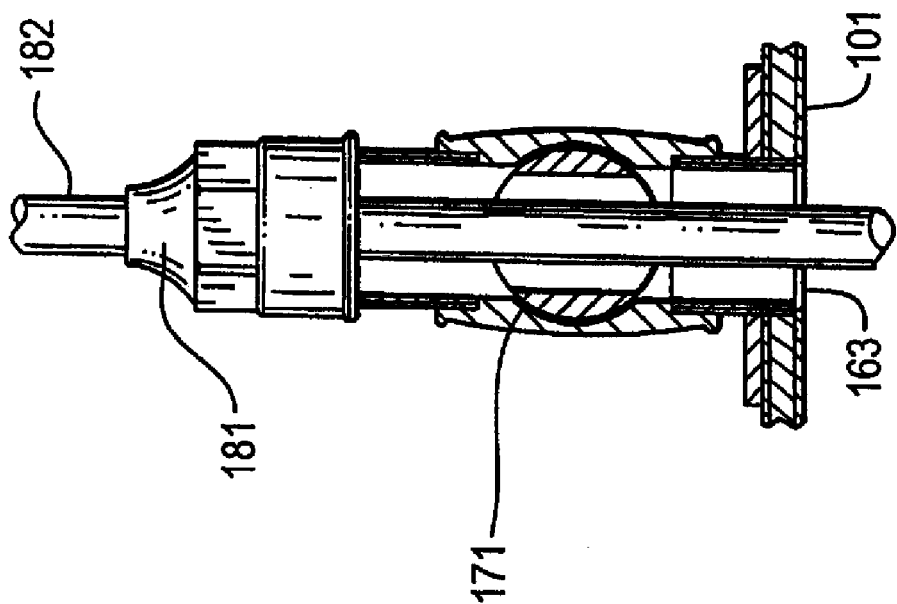
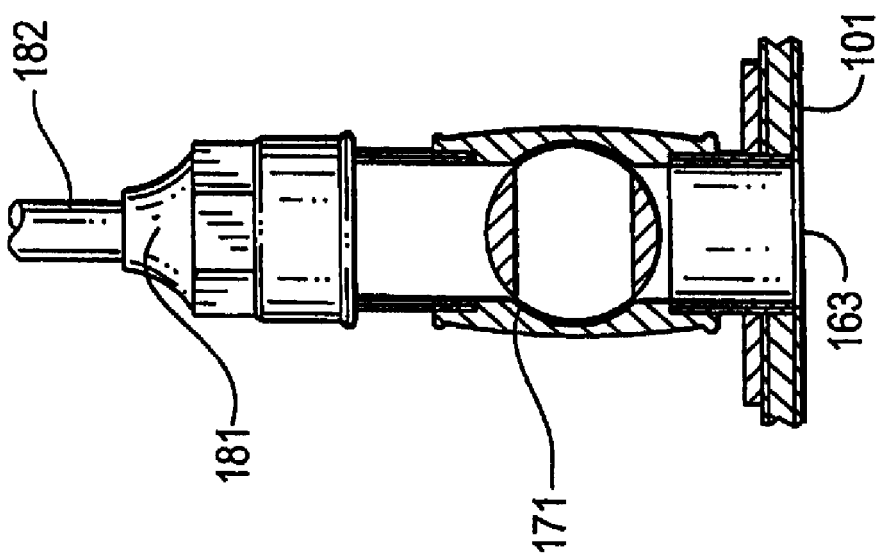

INSTALLATION OF CURED IN PLACE LINERS WITH DUAL GLAND AIR INVERSION AND STEAM CURE APPARATUS

CROSS REFERENCE TO RELATED APPLICATIONS

This application is a divisional of pending application Ser. No. 11/504,909, filed Aug. 16, 2006, which is based on and claims the benefit of U.S. provisional application Ser. No. 60/708,934, filed Aug. 17, 2005.

BACKGROUND OF THE INVENTION

This invention relates to inversion and installation of a cured in place by air inversion and steam curing, and to an apparatus having dual rigid glands for the inversion and cure of the liner. The methods and apparatus allow use of a hold back strap to control the speed of inversion and a perforated lay flat hose for introduction of steam to cure with an exhaust port for continuous flow-through without deflating the liner prior to steam cure. The methods and apparatus are particularly well suited for installing liners from about 18 to 36 inches to about 72 inches and greater.

It is generally well known that conduits or pipelines, particularly underground pipes, such as sanitary sewerpipes, storm sewerpipes, water lines and gas lines that are employed for conducting fluids frequently require repair due to fluid leakage or deterioration. The leakage may be inward from the environment into the interior or conducting portion of the pipelines. Alternatively, the leakage may be outward from the conducting portion of the pipeline into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles on the overhead surface or similar natural or man made vibrations, or other such causes. Regardless of the cause, such leakage is undesirable and may result in waste of the fluid being conveyed within the pipeline, or result in damage to the surrounding environment and possible creation of a dangerous public health hazard. If the leakage continues it can lead to structural failure of the existing conduit due to loss of soil and side support of the conduit.

Because of ever increasing labor, energy and machinery costs, it is increasingly more difficult and less economical to repair underground pipes or portions that may be leaking by digging up and replacing the pipes. As a result, various methods had been devised for the in place repair or rehabilitation of existing pipelines. These new methods avoid the expense and hazard associated with digging up and replacing the pipes or pipe sections, as well as the significant inconvenience to the public. One of the most successful pipeline repair or trenchless rehabilitation processes that is currently in wide use is called the Insituform® Process. This Process is described in U.S. Pat. Nos. 4,009,063, 4,064,211 and 4,135,958, all the contents of which are incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. Generally, the liner is installed utilizing an eversion process, as described in the later two identified Insituform patents. In the eversion process, radial pressure applied to the interior of an everted liner presses it against and into engagement with the inner surface of the pipeline. However, the Insituform Process is also practiced by pulling a resin impregnated liner into the conduit by a rope or cable and using a separate fluid impermeable inflation bladder or liner that is everted within the liner to cause the liner to cure against the inner wall of the existing pipeline. Such resin impregnated liners are generally referred to as "cured-in-place-pipes" or "CIPP liners" and the installation is referred to a CIPP installation.

The CIPP flexible tubular liners have an outer smooth layer of relatively flexible, substantially impermeable polymer coating the outside of the liner in its initial state. When everted, this impermeable layer ends up on the inside of the liner after the liner is everted during installation. As the flexible liner is installed in place within the pipeline, the pipeline is pressurized from within, preferably utilizing an eversion fluid, such as water or air to force the liner radially outwardly to engage and conform to the interior surface of the existing pipeline.

Typically, an eversion tower is erected at the installation site to provide the needed pressure head to evert the liner or a bladder. Alternately, an eversion unit as shown and described in U.S. Pat. No. 5,154,936, No. 5,167,901 (RE 35,944) and No. 5,597,353, the contents of which are incorporated herein by reference. Cure may be initiated by introduction of hot water into the everted liner through a recirculation hose attached to the end of the everting liner. Inversion water is recirculated through a heat source such as a boiler or heat exchanger and returned to the inverted liner until cure of the liner is complete. The resin impregnated into the impregnable material is then cured to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

The eversion tower, which was time consuming to construct, caused workers to be 30 feet above the ground often near trees and electrical wires. This method was improved by an apparatus, which allowed Insituform to create a hydraulic head by the use of a sphincter valve. The liner was fed into the top of the apparatus and pulled through the sphincter valve by pressurized water below the valve. The pressurized water applied a force on the nose of the liner causing it to invert into the pipe being rehabilitated. These apparatuses for the rehabilitation of small diameter pipe have been in use for about fifteen years.

The major disadvantage to the use of these apparatuses with water is the quantity and availability of the inverting water. Water must be heated typically from 55° F. to 180° F. in order to affect the cure, and then cooled by the addition of more water to 100° F. before being released to an acceptable disposal system.

This disadvantage may be overcome by using air in lieu of water to create the inverting force. Once the impregnated liner is fully inverted, it then can be cured with steam. Although water is necessary to produce steam, the quantity of water in the form of steam is only 5-10% of that required for water inversion, cure and cool down. This means that steam can be used for curing even if water is not readily available on site. This drastic reduction in the quantity of water is the result of the higher energy available from one pound of water in the form of steam versus one pound of heated water. One pound of steam condensing to one pound of water gives off approximately 1000 BTUs while one pound of water gives off only one BTU for each degree in temperature drop. This reduced water requirement plus virtual elimination of the heat up cycle greatly reduces cure cycle and installation time.

With this apparent advantage in using air inversion and steam cure why has the industry been slow to abandon water inversion and hot water cure?

When water is used to invert the resin-impregnated liner, the uninverted portion of the liner from the inverting nose to the inverting apparatus is buoyed up by a force equal to the quantity of water displaced by the liner. In the case of CIPP liners, this mean the effective weight of the liner is substantially reduced, as is the force necessary to pull the uninverted liner forward to the inverting nose. When air is used to create the inverting force, the uninverted liner lies on the bottom of the pipe and the air pressure acting on the inverting nose of the liner must pull the full weight of the liner forward.

Three forces must be over come to invert a CIPP liner no matter what is used to create the inverting energy. These forces are:
1. Force required to invert the liner (turn liner inside out). This force varies by liner thickness, material type and relation of liner thickness to diameter.
2. The force necessary to pull the liner from the inverting apparatus to the inversion nose.
3. The force necessary to pull the liner through the inverting apparatus.

Force number one (1) above is generally the same for both air and water inversions.

Force number two (2) varies greatly between air and water and can limit the length of air inversions. There is limit on how much pressure can be used to invert a liner without adversely affecting the quality of the installed CIPP liner and/or damaging to the existing conduit. Lubricant can be used for both water and air inversion to reduce the required pulling force.

Force number three (3) can vary based on the apparatus design. In most apparatus presently in use, the force required to pull the liner through the apparatus will increase when either or both forces one and two increase. This is caused by the fact that in order to increase available inversion energy, typical apparatus in use today restrict loss of pressurized fluid from the pressure chamber below the liner entry point into the apparatus and the cuff and banded end of the liner being inverted. This restriction is typically accomplished by increasing the air pressure in a pneumatic sphincter gland, or by using a gland that is energized by the inverting fluid. The movement inward in typical cases is restricted by the gland material and compression of the inverting CIPP liner. This in turn causes an increase on the friction between the inverting CIPP liner and gland.

In view of the benefits of steam cure compared to hot water cure, the use of steam has been proposed in view of the energy it carries. Air inversion of an inflation bladder and flow-through steam to cure has been disclosed in Insituform U.S. Pat. No. 6,708,728 and No. 6,679,293, the contents of which are incorporated herein by reference. The processes disclosed in these recently issued patents utilize pull in and inflate technology and are currently in use for small diameter liners. They provide advantages over water eversion for small diameters. However, the process described does not provide for use of a lay flat hose for introduction of steam. Moreover, use of a puncturing canister disclosed in these patents is not suitable for medium and large diameter liners. Generally, medium size liners are considered to be those between about 18 and 36 inches in diameter. Large diameters are those in excess of about 42 inches and larger in diameter.

Accordingly, it is desirable to provide processes for improved air inversion/steam cure installation of CIPP liners that allow for use of a hold back strap and lay flat hose for distribution of steam into the inverted liner to insure complete cure without thermal stratification and without having to deflate the liner prior to injecting steam for curing.

SUMMARY OF THE INVENTION

Generally speaking, in accordance with the invention, a cured in place pipe liner is inverted using an installation apparatus having two selectively and independently operable rigid glands. The apparatus provides for introducing a curing fluid after inversion without deflating the liner. It includes an open frame for securing the liner that is inverted before passing the liner through a first selectively operable rigid gland used to form an air or steam seal and a second selectively operable rigid gland for forming an air seal for inversion.

In a preferred embodiment of the invention the inversion apparatus is a vertically disposed frame for positioning over a manhole entry so that a resin impregnated liner secured to the frame is inverted and passes through first and second glands prior to entering the existing conduit. The liner has a dry portion secured to and passing through the frame fitted with at least one inversion curing fluid port positioned to be between the two glands on the frame. Each gland has two rigid members and the glands are independently operated. In one embodiment of the invention, one member is a fixed member on one side and a cooperating opposed displaceable rigid member to form the gland. Alternatively, both rigid members may be displaceable to form the seal. The first or upstream gland may include compressible facing material fixed over the rigid members to insure formation of a steam seal during the cure cycle. Preferably, the rigid members are tubes or pipes with the inverted portion of the liner providing sufficient compressible material to form a suitable steam seal. The second or downstream air gland is set to a fixed gap during the first half of the inversion depending on the thickness of the liner. Use of this apparatus allows an increase in inversion pressure that does not require additional gland pressure on the resin impregnated liner to maintain the seal. In addition, an increase in pressure on the gland when set to a fixed gap does not increase pressure on the liner.

The portion of liner secured to the entry frame that passes through the first and second glands is maintained dry and not impregnated with resin. At least one fluid port for introduction of inversion and then curing fluid is formed through the wall of the dry portion of liner. In a preferred embodiment of the invention, the dry portion of liner includes two ports. A first upstream port located between the two glands is for entry of inversion fluid, such as air and is also used for introduction of steam during the curing phase. A second port is installed in the wall of the dry portion of the liner downstream of the second gland and is used for introduction of inversion fluid, such as air for inverting the liner. Closing of the downstream port and gland at the end of the first half of the inversion allows access to introduce a cure fluid hose, such as a steam hose and fittings, from the open end of the dry liner. The first gland is then closed with the second gland opened to complete the inversion. At this time, the spaces in the second gland are removed and the inversion completed. At the end of the inversion the second gland is closed and first gland is opened to attach the cure fluid hose to the upper port and source of curing fluid. The first gland is then closed and second gland opened to allow curing fluid to flow into the inverted liner to effect the cure of the resin.

In one embodiment of the invention, an inversion enhancement sleeve of an impregnable material may be placed in the dry inlet portion of the liner so that the inverting liner with impermeable layer on the outer surface easily passes through the dry portion of the liner secured in the frame. The sleeve facing the impermeable layer of the inverting liner can be lubricated to facilitate the inversion through the gland.

Selective opening and closing of the glands allows passage of a hold-back cable or strap to control the speed during the second half of the inversion and passage of a lay flat hose and steam fitting for introduction of heated air or steam during cure. Use of a perforated lay flat hose for steam cure allows for introduction of steam along the entire length of the inverted liner to avoid the consequences of accumulation of condensate that often leads to poorly cured sections of liner in steam cure processes. The dual glands allow for the lay flat hose with steam attachment to pass through the frame and into the inverted liner without deflating the liner prior to introduction of curing fluid. Preferably, the lay flat hose has alternating holes formed along its length near the edge. Typically, this is ¼ to 1½ inches from the edge of the lay flat hose. This pattern of holes insures distribution of steam at the bottom along the full length of the liner regardless of the orientation of the hose.

A sample and porting sleeve with at least one pre-installed bulkhead fitting for forming an exhaust port in the distal end of the inverted liner for receiving a porting tool may be positioned in the distal access point. Once the inversion is stopped with the distal end of the liner captured by the porting sleeve, a porting drill may be used to form an exhaust port in the inflated liner. An adjustable exhaust hose is connected to the exhaust port and steam is introduced into the liner through the lay flat hose to cure the resin without allowing the inverted liner to deflate.

Accordingly it is an object of the invention to provide an improved method of inverting a CIPP liner.

It is another object of the invention to provide a dual gland apparatus for inverting a CIPP liner with air and curing with steam.

It is another object of the invention to provide an improved method for air inversion and steam cure of a CIPP liner with an apparatus having rigid dual glands.

It is a further object of the invention to provide an improved method wherein a cured in place pipe liner is inverted with air and cured with steam without deflating the liner after being positioned within the existing conduit.

Yet another object of the invention is to provide a method and apparatus suitable for air inversion and steam cure wherein the liner is inverted through a segment of liner formed with at least one port for introduction of air and/or steam.

Still another object of the invention to provide an improved method of air inversion of a CIPP liner with a holdback strap and lay flat hose for introduction of steam to cure the liner.

Still other objects and advantages of the invention will in part be obvious and will in part be apparent from the specification.

The invention accordingly comprises the several steps and the relation of one or more of such steps with respect to the others, and the apparatuses possessing the features, properties and relation of elements which are exemplified in the detailed disclosure and the scope of the invention will be indicated in the claims.

BRIEF DESCRIPTION OF THE DRAWINGS

For a fuller understanding of the invention, reference is had to the following description taken in connection with the accompanying drawings in which:

FIGS. 11(a)-11(g) are schematic views in cross-section of the procedure for forming an exhaust port in the inverted liner captured in the porting sleeve of FIG. 9, and inverted cured in place liner entering a sample and porting pipe, before and after porting with a porting tool;

FIGS. 12(a) and 12(b) are schematic views in cross-section of the steps for installing a condensate drain in the distal end of the inverted liner after performing the steps shown in FIGS. 11(a)-11(g);

DETAILED DESCRIPTION OF THE PREFERRED EMBODIMENTS

An improved method and apparatus for air inverting and steam curing a CIPP liner in compliance with ASTM F1216 *Standard Practice for Rehabilitation of Existing Pipelines and Conduits by the Inversion and Curing of a Resin-Impregnated Tube* is described. The method and apparatus are well suited for the installation of medium diameter CIPP liners working from the surface through structures, such as manholes to rehabilitate existing buried pipelines and conduits.

Figure 1:
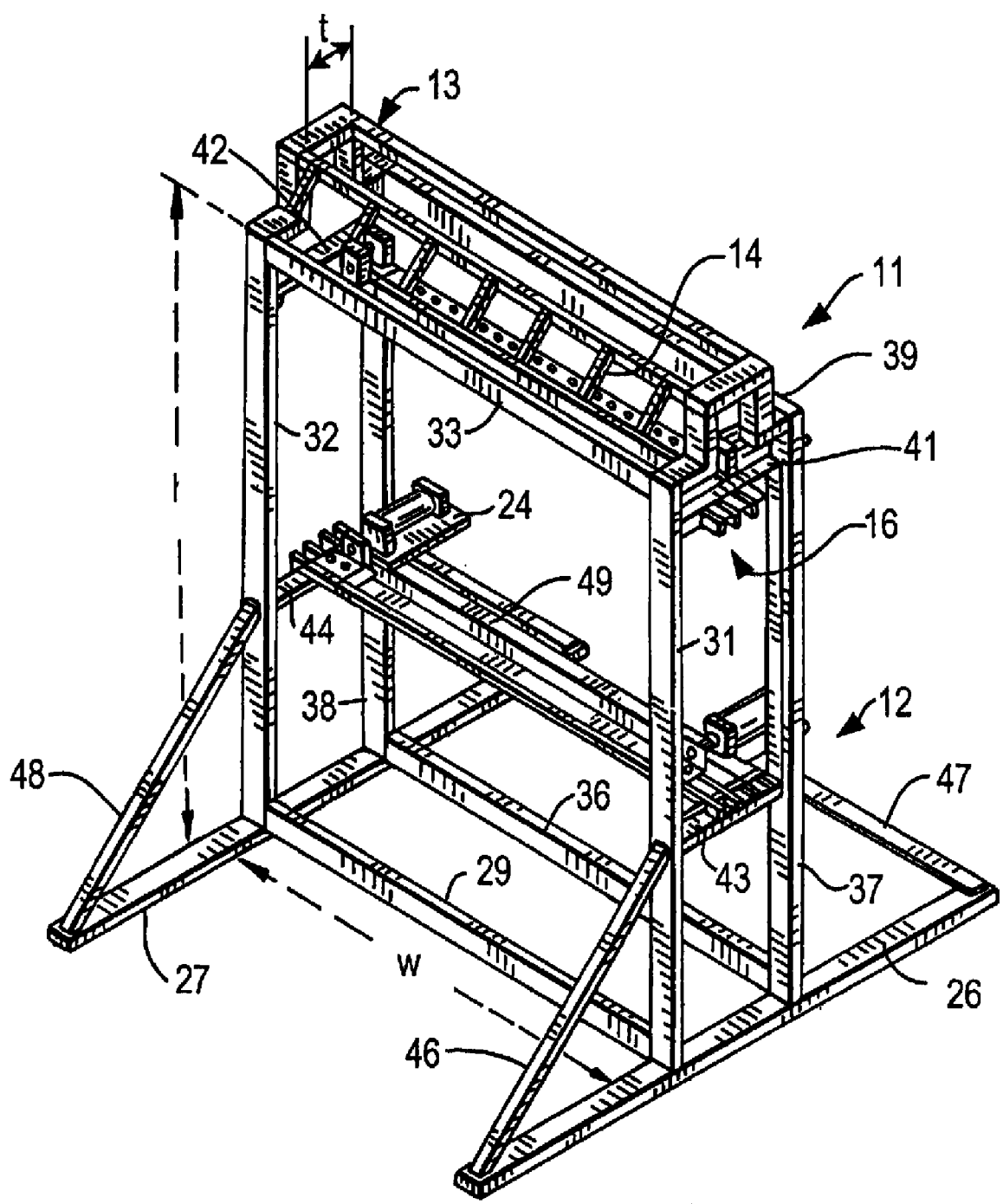
FIG. 1 is a schematic perspective view of an apparatus with dual rigid glands for air inversion and steam cure of a cured in place pipe liner constructed and arranged in accordance with the invention.
Figure 2:
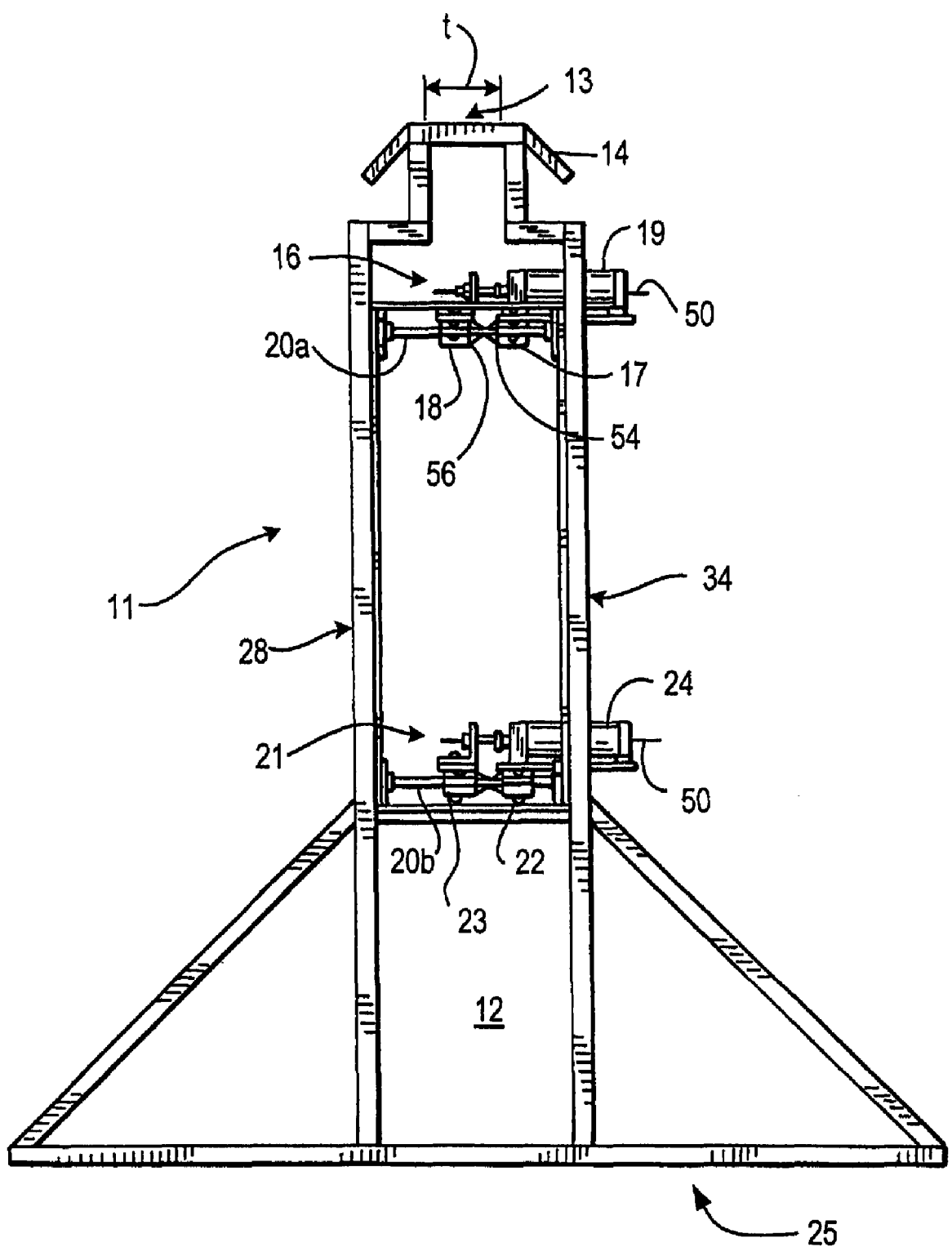
FIG. 2 is a schematic right side elevational view of the inversion apparatus of FIG. 1.

An inverting apparatus 11 constructed and arranged in accordance with the invention is shown in FIG. 1. Apparatus 11 is a rigid frame dimensioned to be positioned over the inverting access to the conduit to be lined. Apparatus 11 is fabricated from metal bars or tubes to form a frame 12 having a sufficient width "w" to receive a flattened cured in place pipe liner to be installed. Frame 12 is substantially rectangular in the illustrated embodiment and has a rectangular entry opening 13 with a plurality of hooks 14 to secure the inverting liner. Opening 13 has a thickness "t" selected to allow the dry portion of an inverted wetout liner to be secured on hooks 14 and be inverted through entry opening 13.

Frame 12 has a height "h" sufficient to support a first or upstream gland 16 formed of a fixed gland member 17 and an opposed cooperating displaceable gland member 18 positioned adjacent to entry 13. A pair of air cylinders 19 are attached to the ends of frame 12 and connected to displaceable member 18 for displacing member 18 towards fixed member 17. In the illustrated embodiment, cylinders 19 are pneumatic air cylinders with linear guide bearings 20a. Cylinders 19 may be any mechanical closing mechanism or motor of any type, such as hydraulic or electrical, or a mechanical clamping mechanism.

A second or downstream gland 21 formed in the same manner as first gland 16 has a rigid gland member 22 fixed to frame 12 and a moveable gland member 23 on a pair of linear guide bearings 20b with an attached air cylinder 24. Height "h" of frame 12 is selected to provide sufficient room between first gland 16 and second gland 21 to utilize a fluid inlet port installed in the dry portion of an inverting liner for introduction of air and/or steam. An inverting fluid inlet port is installed in the dry portion of the inverted liner and positioned downstream second gland 21 and before the manhole access. A complete description of the liner and installation ports will be set forth in more detail below.

In the illustrated embodiment of FIG. 1, frame 12 has a base 25 formed of two side tubes 26 and 27 welded to a rectangular front frame 28 formed of a bottom tube 29, two vertical side tubes 31 and 32 and a top tube 33. Vertical tubes 31 and 32 are welded to base side tubes 26 and 27, respectively. A matching rectangular back frame 34 formed of a bottom tube 36, two side tubes 37 and 38 and a top tube 39 is welded to base side beams 26 and 27 in the same manner as front frame 28. A pair of first horizontal gland support tubes 41 and 42 is secured between front side tubes 31 and 32 of front frame 28 and side tubes 37 and 38 of back frame 34. Similarly, a pair of support beams 43 and 44 is secured between front frame 28 and back frame 34 to support second gland 21. Four angled support tubes 46, 47, 48 and 49 are welded between the front and back of side tubes 26 and 27 to provide stability to frame 12. While angled support tubes are shown, it is contemplated that rectangular support members forming a step may be used to provide a working platform at or about the height of second gland 21.

Air cylinders 19 and shown mounted above first gland 16 and second gland 21. Each cylinder is connected to a coupling so that runs on a pair of linear guide bearings 20. Air cylinders 19 each have an air coupling 50 connected to an air switch control board 53 shown in FIG. 3.

Fixed gland member 17 and displaceable gland member 18 of first gland 16 has a compressible high temperature resistant blanket 54 and 56 mounted on the opposed mating faces. This compressible material 54 and 56 will conform to and tightly engage an inverting liner with a holdback strap and lay flat hose as they pass through first gland 16 during the second half of the inversion. In addition, compressible material 54 and 56 will form a suitable conforming seal when first gland 16 is closed during steam cure.

The rigid cooperating opposed faces of members 22 and 23 of second gland 21 may be flat. Curvature may be added to the mating surfaces by welding a small diameter pipe to beams 22 and 23 or by using tubes or pipes for member 22 and 23. This curved surface provides a smoother surface for engaging the inverted liner.

Second gland 21 forms the air seal during air inversion. During the start and first half of the inversion, second gland 21 is closed to a distance apart of about four times the thickness of the liner by use of a gap setting device. This device may be appropriately sized spacers placed on guide bearings 20a and 20b. Once the holdback strap and lay flat hose pass through second gland during the second half of the inversion, the gap of second gland 21 is reduced to about twice the liner wall thickness.

By utilizing this construction, an increase in inverting air pressure will cause the liner to invert without requiring an increase in pressure on the liner at second gland 21 by members 22 and 23. Air pressure to cylinders 19 may be increased to prevent gland 21 from opening to a gap more than twice the liner thickness. The gap adjustment device, such as spacers placed on guide bearings or threaded bolts prevent a reduction of the gap beyond that desired.

The seal around the inverting liner is created by the dry portion of the liner itself so that the seal has an identical profile and dimension. Thus, it is not necessary to be concerned about forming a seal at the edges of the flattened liner. The length of the edge perimeter of the flattened liner is minimal compared to the long sides of the flattened liner so that stress on the edges are minimal and no addition closure or support at the edges is needed. This allows use of straight rigid tubes or beams to form the gland and seal. The process and apparatus disclosed provide an advantage over prior art inversion devices. In these latter devices forming a seal at the edges is difficult because the inversion commences downstream of the seal or gland. Here, there is an advantage due to the fact that the inversion of the liner has commenced before the liner passes through a gland for forming an inversion and curing seal.

Figure 3:
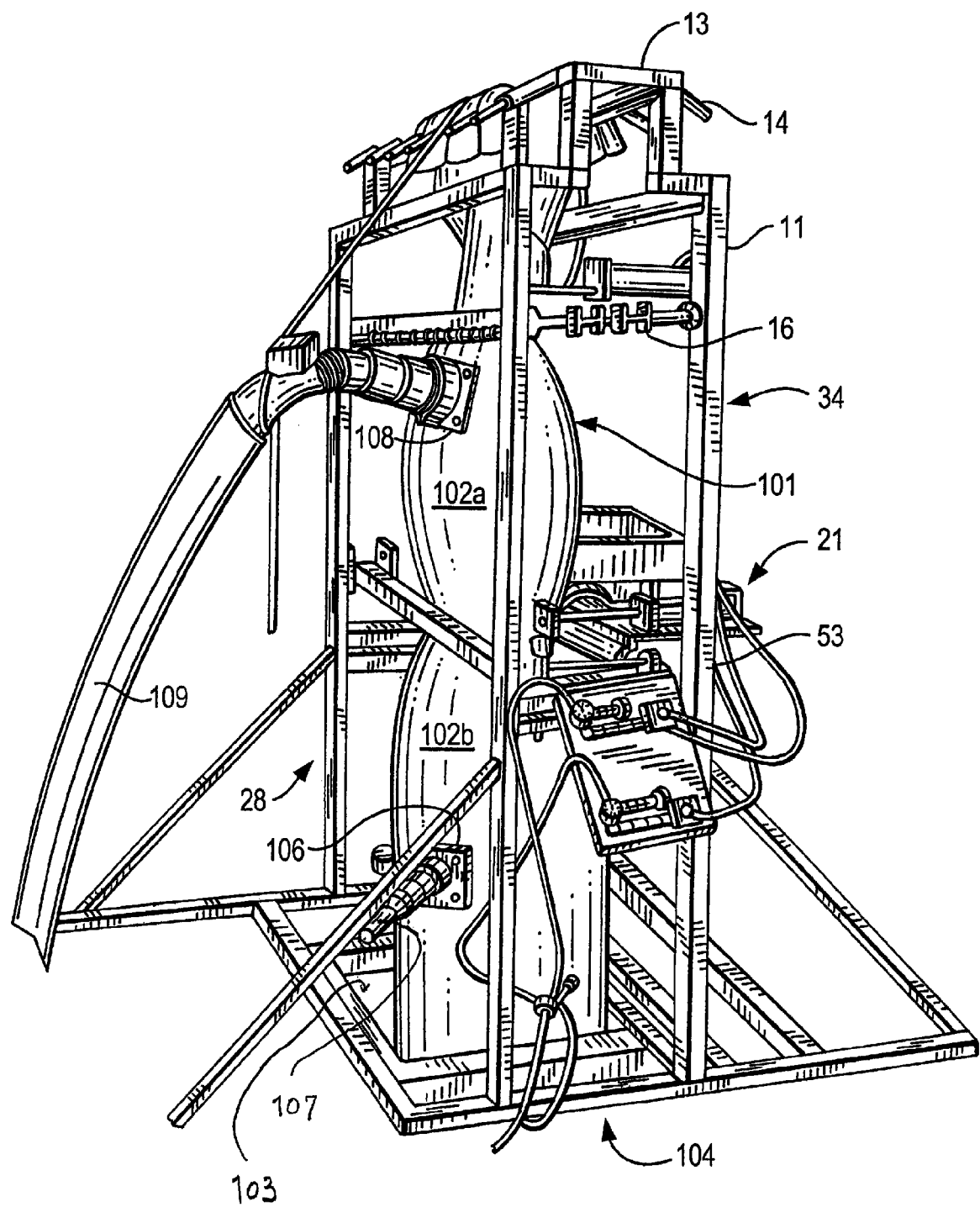
FIG. 3 is a perspective view of the inversion apparatus of FIGS. 1 and 2 with an installed CIPP liner and air and steam connections in place during steam cure in accordance with the invention.

FIG. 3 shows apparatus 11 with an inverted liner 101 secured to hooks 14 on entry opening 13 during the steam curing step. Liner 101 is manufactured with a dry end region 102 and is wetout beginning just prior to where the inverting liner enters the conduit to be rehabilitated. An air inlet port 106 is formed in dry region 102b between second gland 21 and the start of a wetout region 103. An air hose 107 is connected to air inlet port 106 and an air source (not shown).

An air/steam inlet port 108 is also installed in liner region 102a between first gland 16 and second gland 21. A steam hose 109 is coupled to steam inlet port 108 and to a boiler (not shown).

Apparatus 11 in FIG. 3 shows an installation and the position of first gland 16 and second gland 21 after the inversion is complete and during steam cure. Here, first gland 16 is closed forming a steam seal above steam entering steam inlet port 108. Second gland 21 is open allowing steam to pass into inverted liner 101 through a lay flat hose installed with liner 101 to affect cure.

Figure 4:
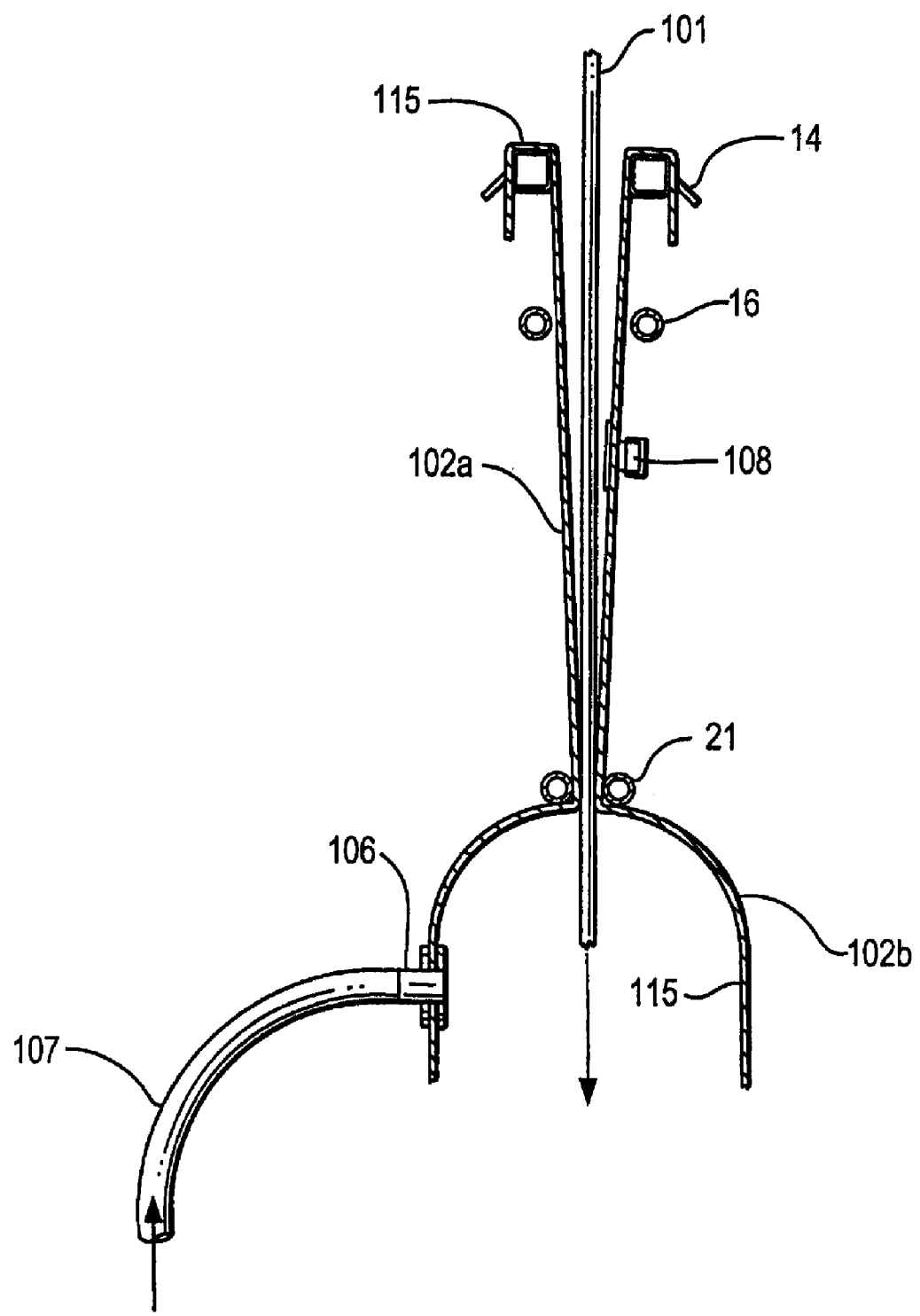
FIG. 4 is a schematic view in cross-section showing the position of the glands of the apparatus of FIG. 3 during the first half of air inversion.
Figure 5:
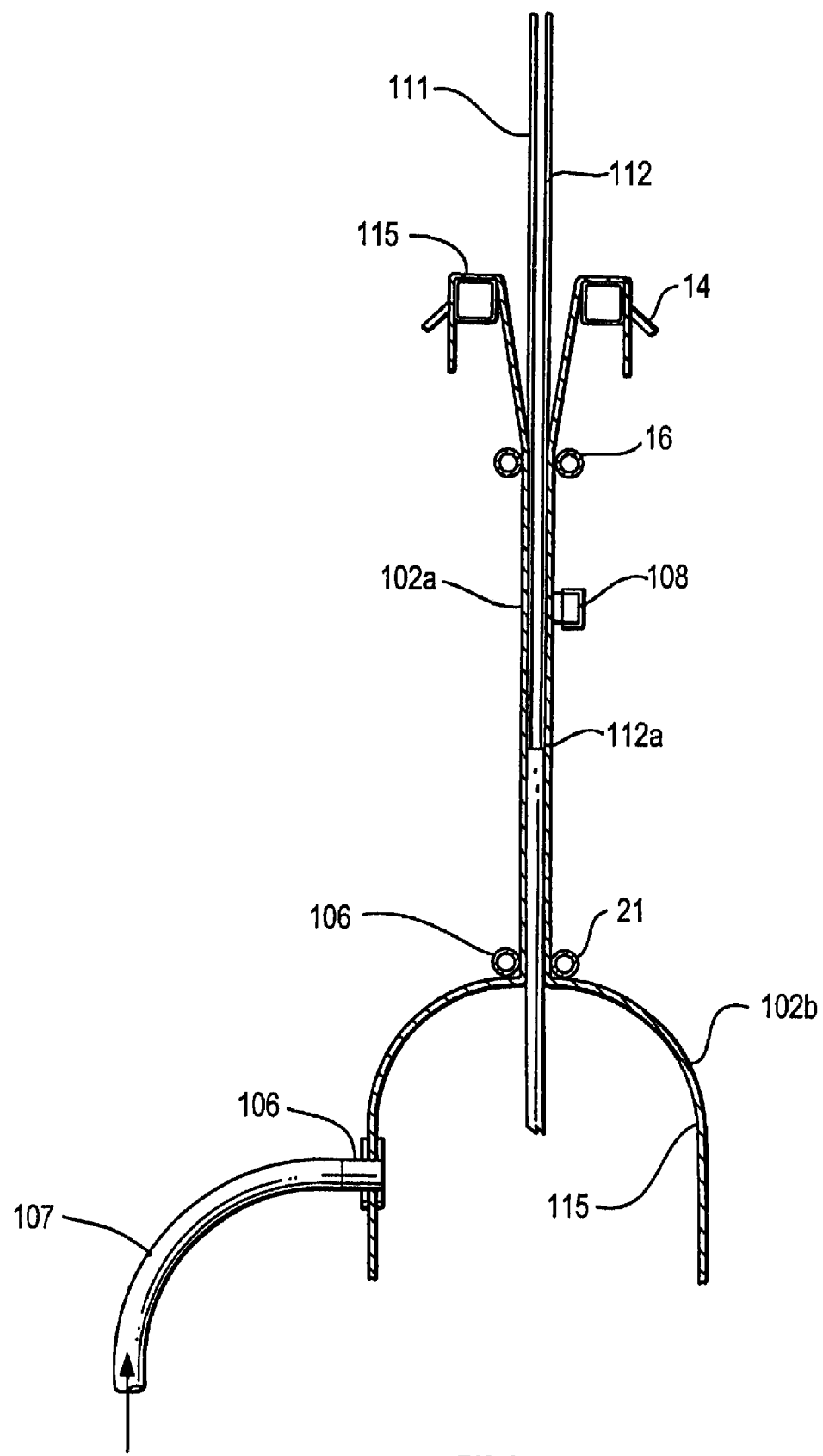
FIG. 5 is a schematic view in cross-section showing the position of the glands of the apparatus of FIG. 3 at the halfway point of inversion.
Figure 6:
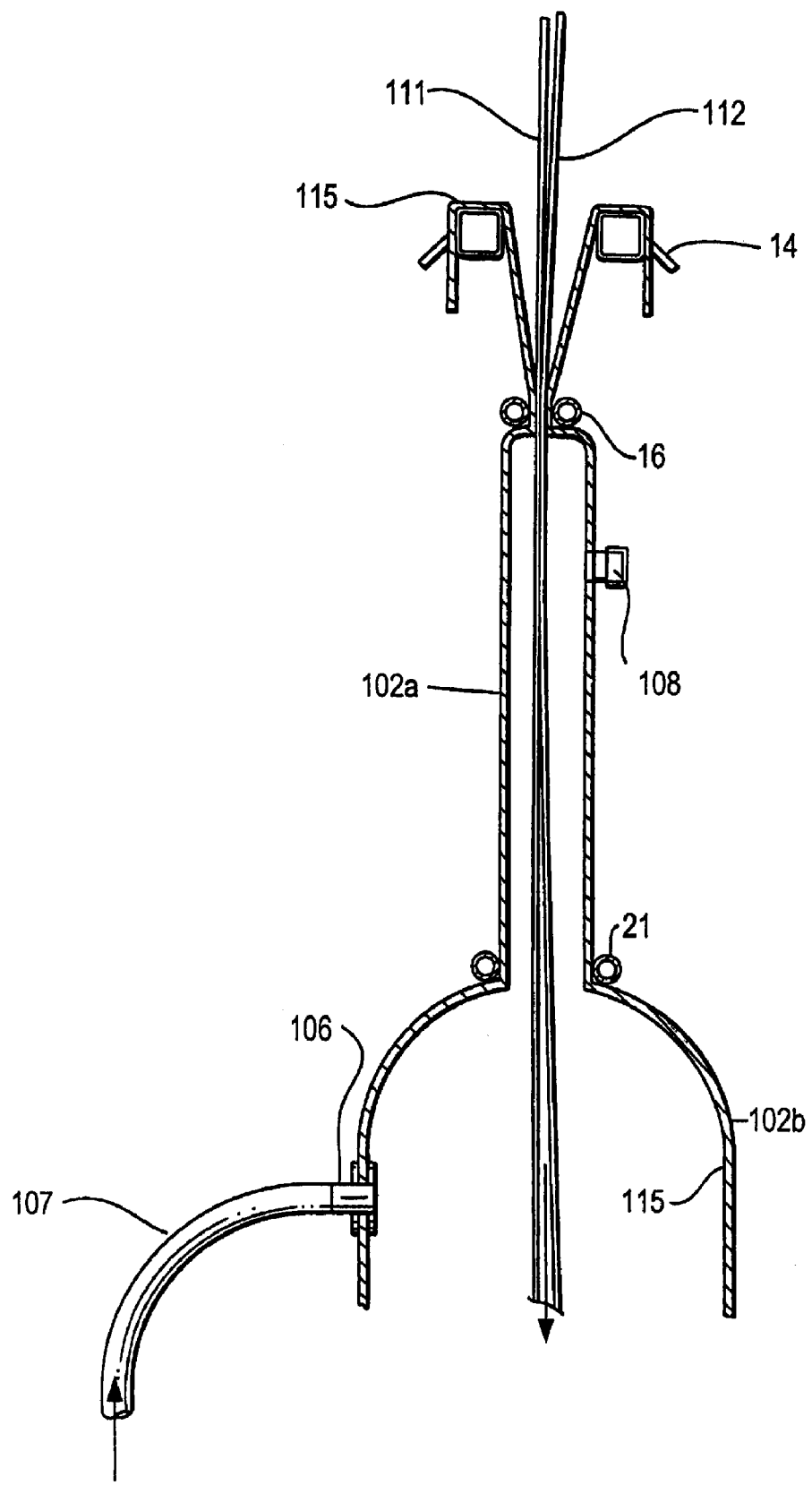
FIG. 6 is a schematic view in cross-section showing the position of the glands of the apparatus of FIG. 3 during the second half of the inversion.
Figure 7:
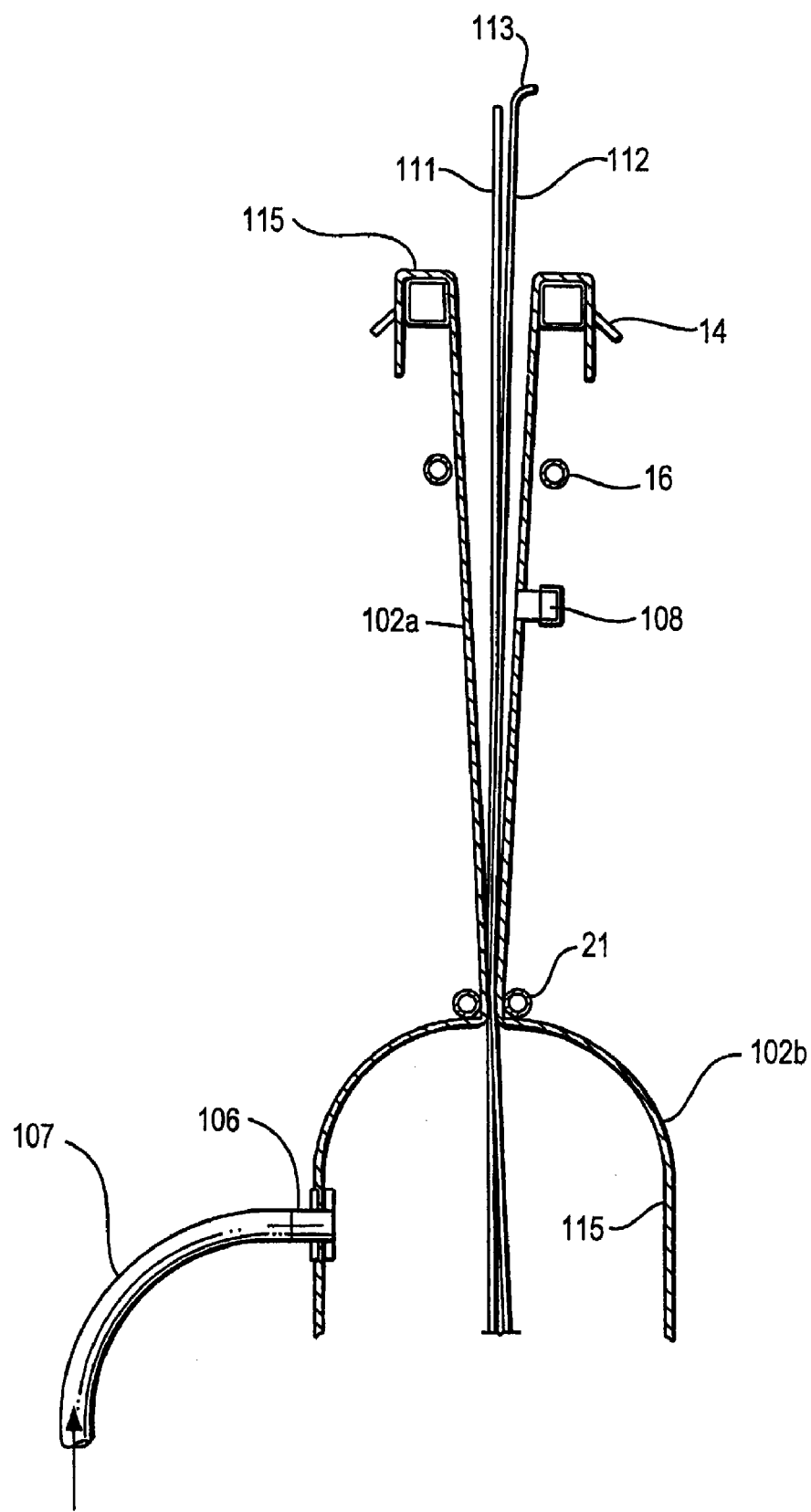
FIG. 7 is a schematic view in cross-section showing the position of the glands of the apparatus of FIG. 3 at completion of inversion.
Figure 8:
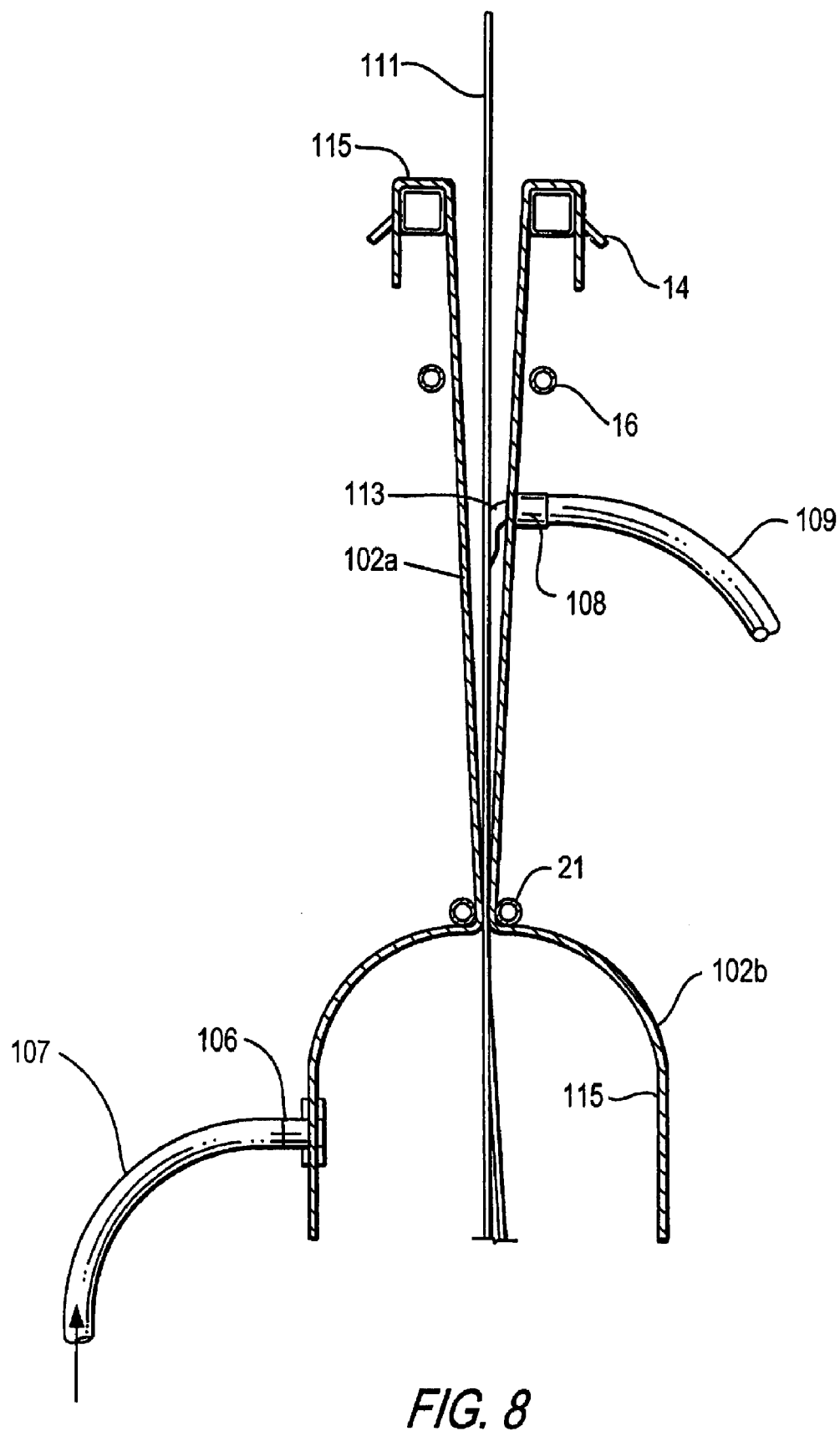
FIG. 8 is a schematic view in cross-section showing the preparatory steps to couple the lay flat hose to the steam inlet prior to cure.

The sequence of steps of the inversion and cure are shown in schematic in sequence in FIGS. 4 to 13. During the first half of the inversion in FIG. 4, first gland 16 is open and second gland 21 is closed to a gap of 4 T (four times the thickness of liner 101) using gap setting devices. Inversion air is fed into air inlet port 106 from an air inlet hose 107 to cause liner 101 to invert within dry liner portion 102b and into the conduit being lined. At the halfway point of the inversion first gland 16 is closed to engage a holdback strap 111 and a lay flat hose 112 as shown in FIG. 5. Lay flat hose 112 has a closed end 112a. Then, during the second half of the inversion as shown in FIG. 6, second gland 21 is opened and inversion air is fed into air inversion inlet port 106 to complete the inversion. At this time second gland 21 is closed and first gland 16 is opened as shown in FIG. 7.

Figure 13:
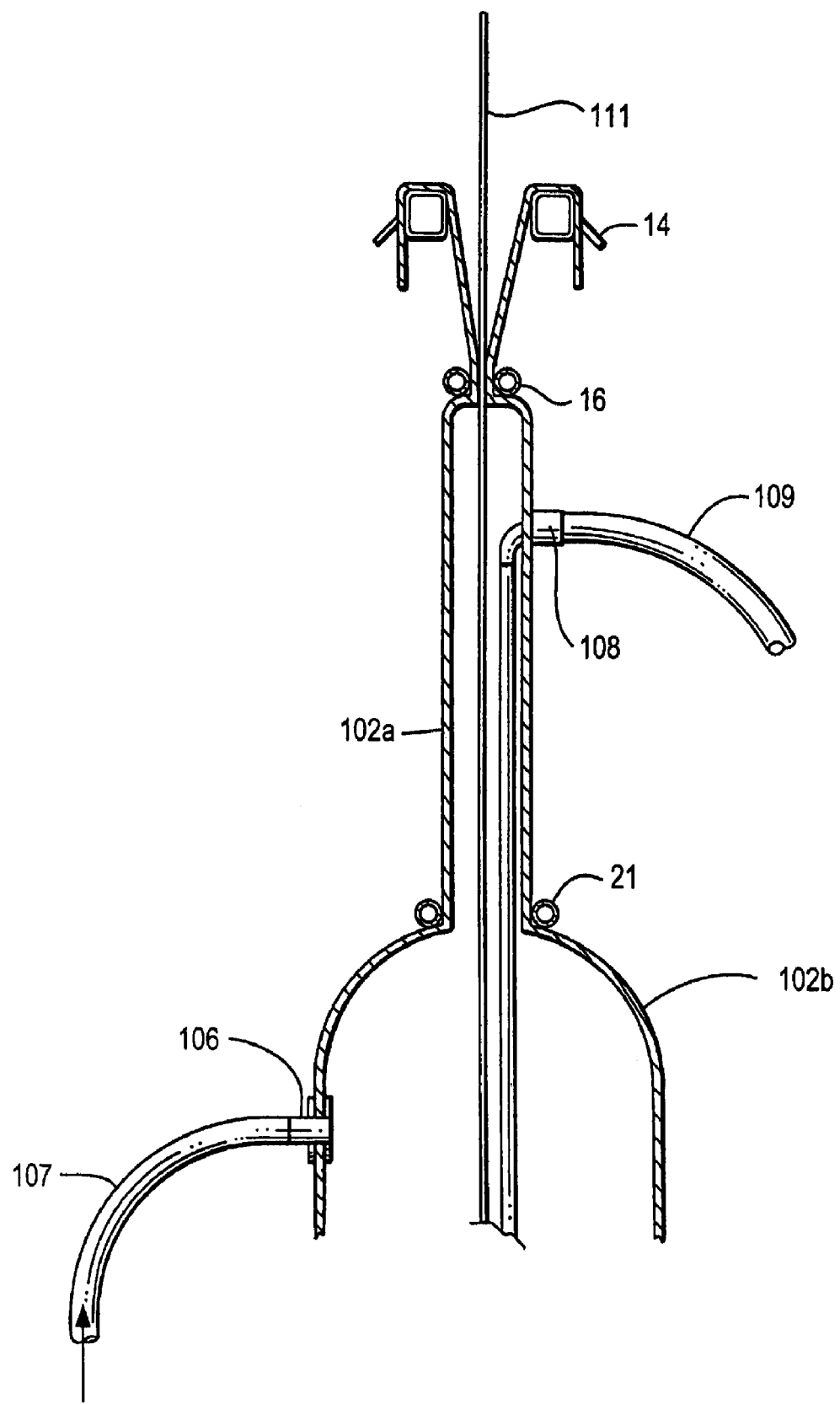
FIG. 13 is a schematic view in cross-section showing the position of the glands of the apparatus of FIG. 3 with air/steam supply hose attached in preparation for introduction of steam for curing.

At this time when first gland 16 is open, lay flat hose 112 is cut above first gland 16 and a steam elbow is attached to the cut end. Steam elbow 113 and excess lay flat hose 112 are lowered into frame 12 between first gland 16 and closed second gland 21 and elbow 113 is attached to the rear side of air/steam port 108. Alternatively, a flexible layflat adapter may be attached to the layflat hose outside of the inverted region which can then be inserted into the air/steam port to facilitate the addition of steam to the inverted tube. The layflat adapter may be a thin tubular rigid bendable metal sleeve with a flared profile which prevents it from being pulled into the air/steam port. The tubular portion of the sleeve is inserted into the cut end of the lay flat and inserted into the inlet port. The lay flat hose is then engaged between the flared region of the sleeve and the port. The slack in lay flat hose 112 will drop into the invert when first gland 16 is closed and second gland 21 opened at the start of the steam cycle as shown in FIG. 13.

In one embodiment of the invention, an inversion enhancement sleeve 115 of an impregnable material may be placed in the dry inlet portion of the liner to facilitate the inversion through the gland In this case an inverting liner with impermeable layer on the outer surface easily passes through the dry portion of liner 101 secured in frame 11. The surface of sleeve 115 facing the impermeable layer of inverting liner 101 can be lubricated to facilitate further the inversion through gland 21.

Figure 9A:
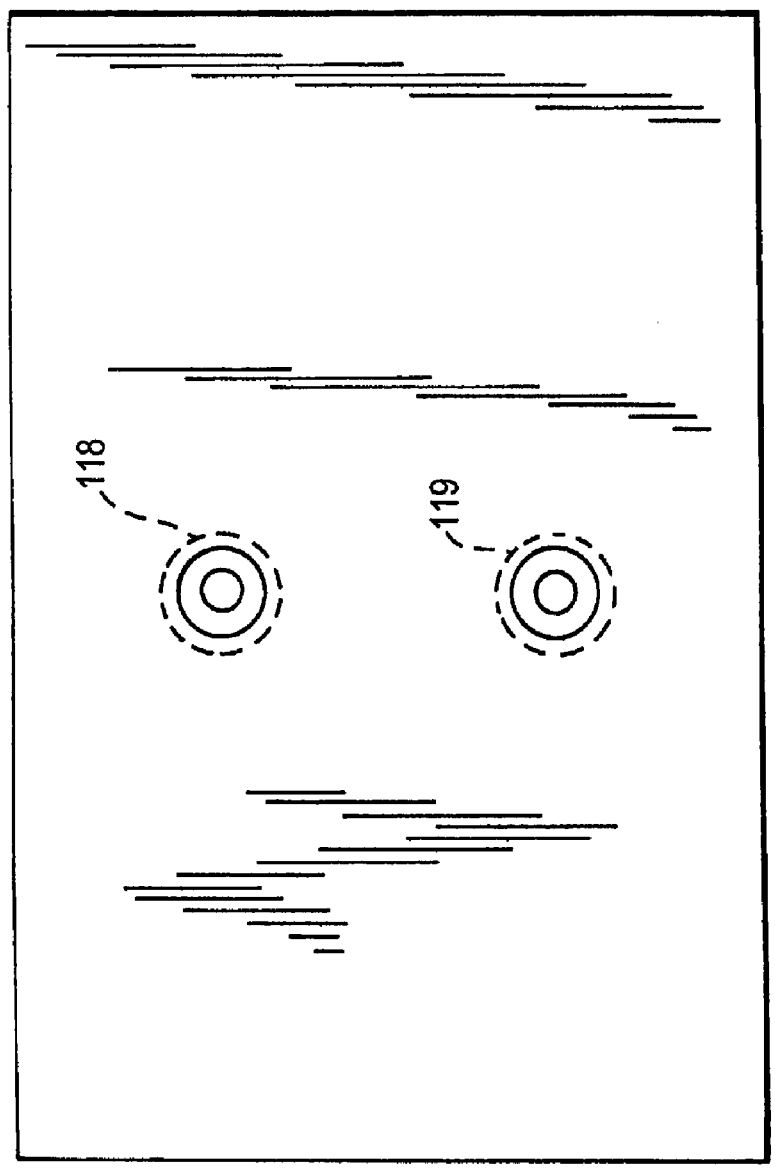
FIGS. 9(a) and 9(b) are schematic plan view and cross-sectional views of a flexible porting sleeve with installed bulkhead fitting for use with the inverted liner.
Figure 9B:
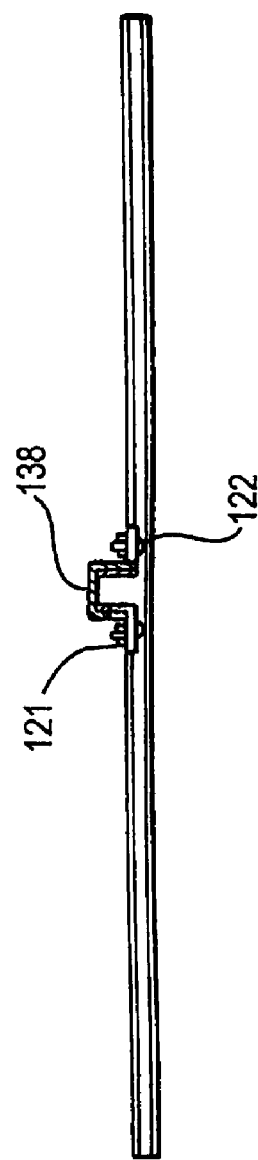
Figure 10:
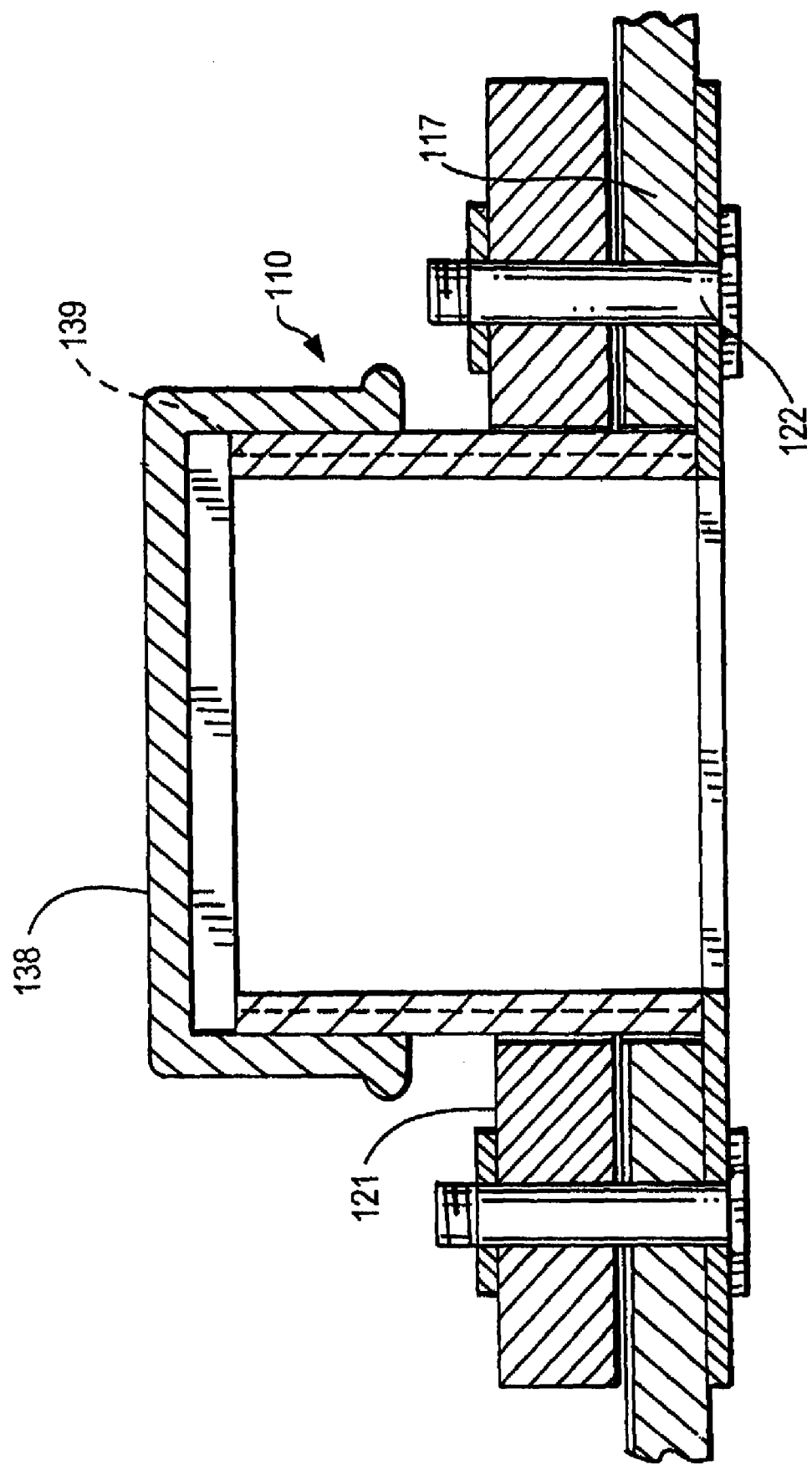
FIG. 10 is an enlarged cross-sectional view of the bulkhead fitting of FIG. 9 showing the details of construction of the porting an inverted end of a fully inverted liner is captured by the sleeve.
Figure 11D:
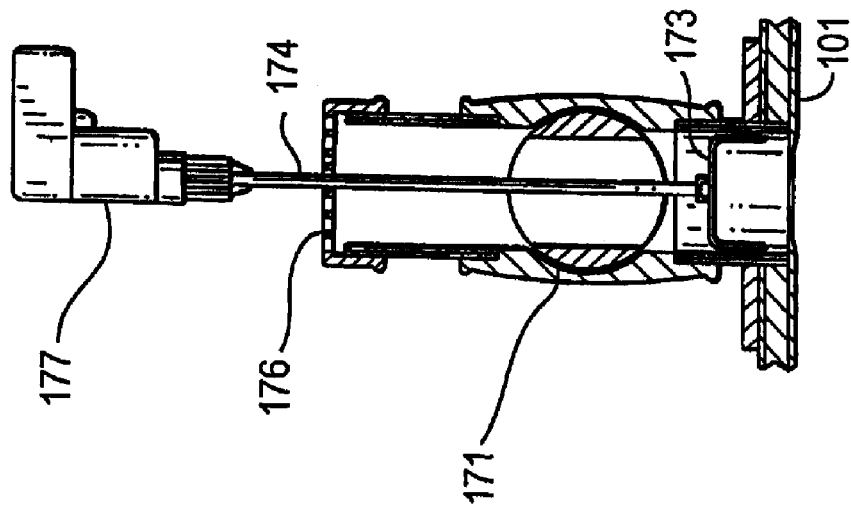
Figure 11C:
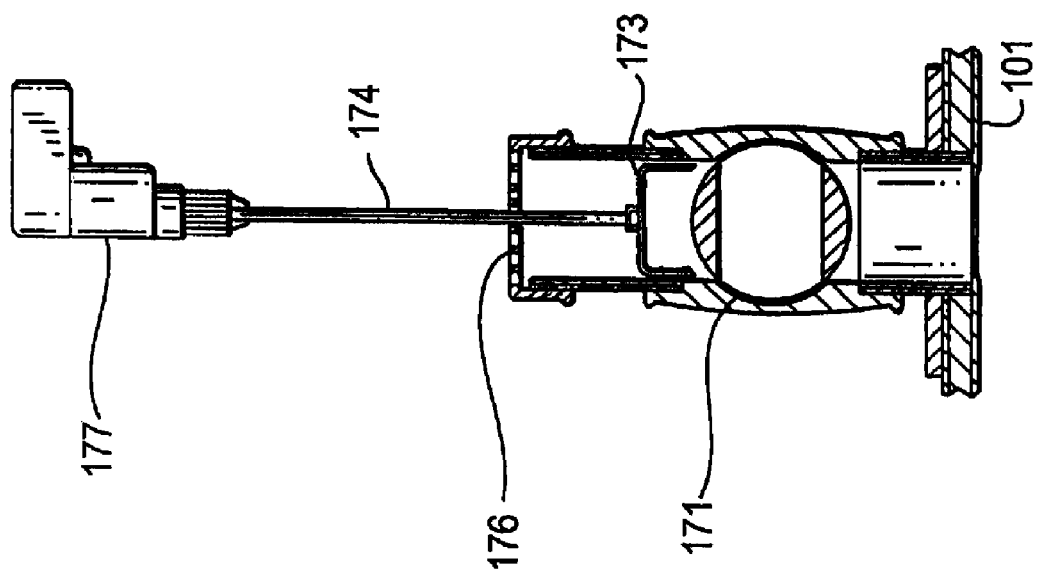
Figure 11G:
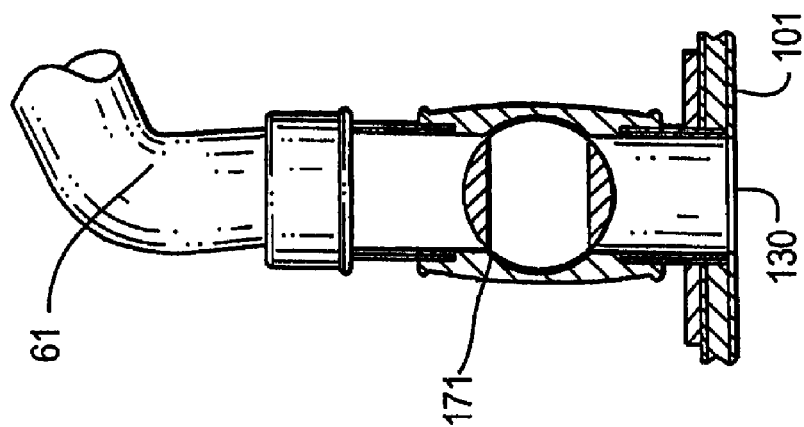
Figure 11F:
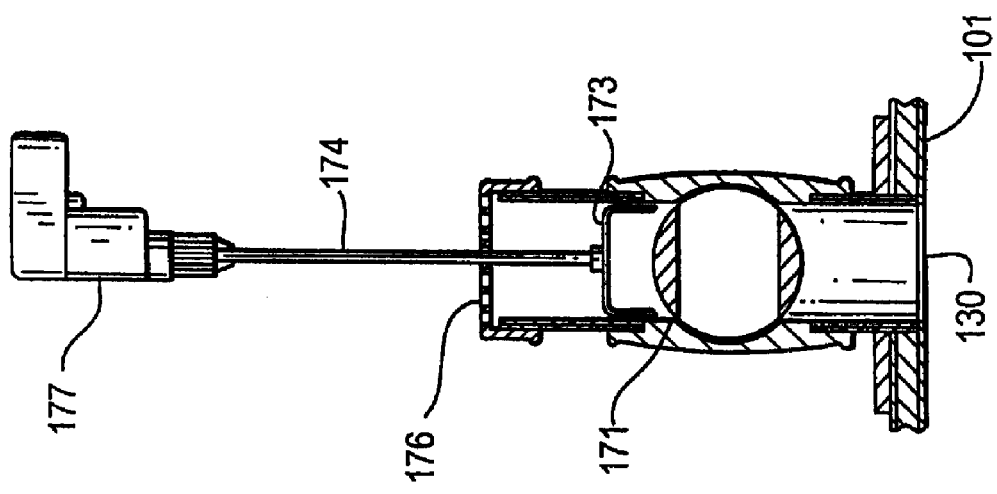
Figure 11E:
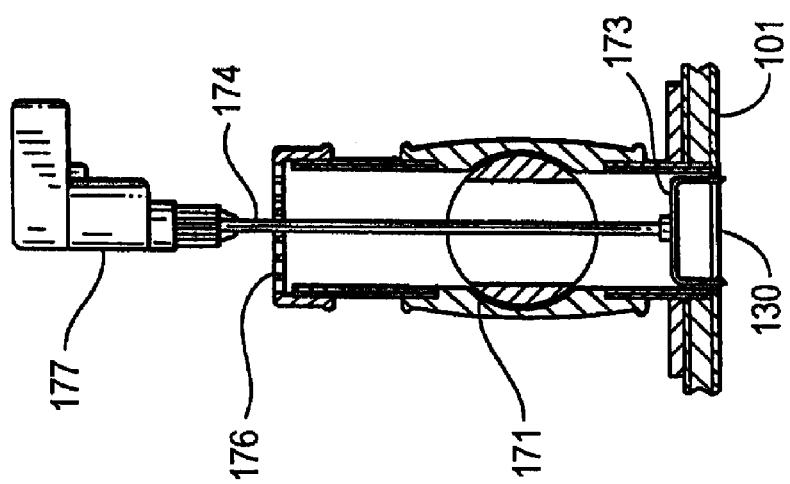

Just after completion of the inversion, inverting liner 101 is ported in the downstream access opening. A flow-through port 130 in the inverted distal end of liner 101 as shown in FIG. 10 is formed without allowing liner 101 to deflate. A flexible porting sleeve 117 as shown in FIGS. 9(a) and 9(b) is secured in the receiving manhole. Sleeve 117, that may be rigid at smaller diameters, includes an exhaust bulkhead fitting 118 and a condensate drain bulkhead fitting 119. FIG. 9 shows one fitting 110 in cross-section secured to sleeve 117 by a flange 121 and bolts 122. Sleeve 117 is secured at the receiving end of the existing conduit and liner 101 is inverted through sleeve and restrained therein. At this time, an exhaust port 130 and a condensate port 163 are formed at bulk head fitting 118 and 119 having a fitting sleeve 139 installed in porting sleeve 117 using the procedure outlined in connection with FIGS. 11 and 12.

Figure 14B:
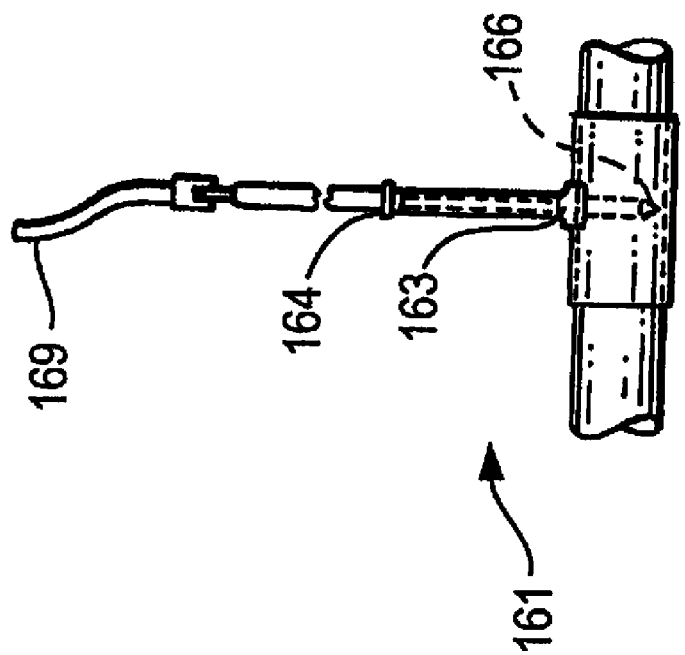
FIGS. 14(a) and 14(b) illustrated an exhaust porting technique suitable for smaller diameter liners.
Figure 14A:
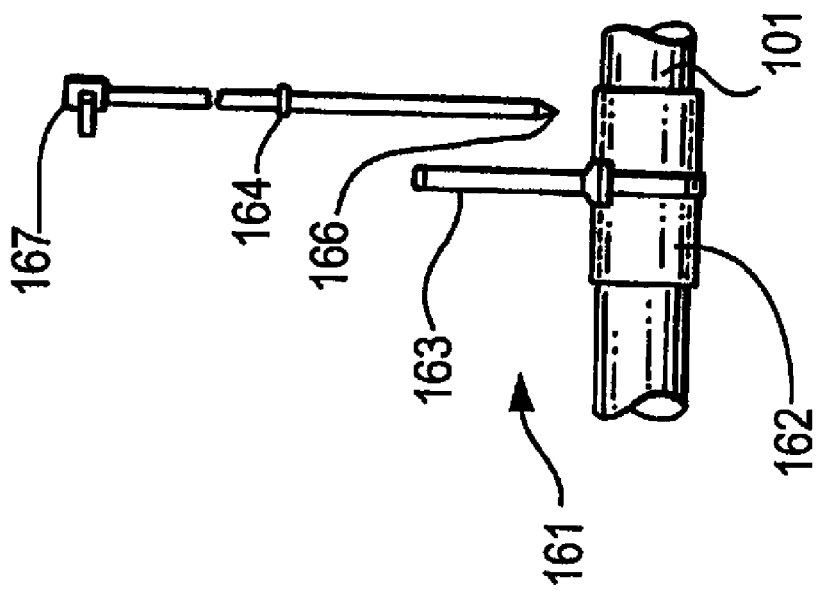

Exhaust port 130 is formed at the distal end following the steps shown in FIGS. 11(a)-11(g). Porting sleeve 117 may be formed from a length of CIPP liner material provided with a second bulkhead fitting 119 for forming second port 163 for a condensate drain 164 as shown in FIGS. 14(a) and 14(b).

A cap 138 is removed and a ball valve 171 is installed on fitting sleeve 139. Ball valve 171 is closed with a nipple 172 installed thereon. A hole saw 173 with a drill stem 174 is inserted in nipple 172 and a threaded hole saw stem guide 176 is secured to the end of nipple 172. A drill 173 is attached to stem 174. Ball valve 171 is opened on port 130 or 163 and drill 177 is started to cut a hole 130 and 163 while maintaining air pressure in liner 101. When port 130 and 163 are fully cut, ball valve 171 is closed and drill 177 and hole saw 173 are removed from fitting 131. Exhaust hose 61 is then attached to nipple 172.

Condensate port 163 may be formed following the same steps as illustrated in FIGS. 11(a) to 11(g). After removal of drill 177 a condensate pipe gland 181 is placed on nipple 172 and a condensate drain hose 182 is place in gland 182 to reach the bottom of liner 101. Gland 181 is tightened to prevent movement of hose 182. For smaller diameter liners, exhaust and condensate ports may be formed using a porting tool as shown in FIGS. 14(a) and 14(b).

Referring now to FIG. 13, steam is introduced into attached perforated lay flat hose 86 to initiate cure of the resin in inverted liner 101 with glands 16 and 21 in the position as shown in FIG. 3. In an exemplary embodiment of the invention, lay flat hose 86 is a high temperature thermoplastic tube 4 inches in diameter with one-eight inch orifices. The size and spacing may vary depending on the boiler and liner size and length. The orifices are created at one foot intervals at almost one-half inch from the folded edges at opposite edges. The distance from the edges may vary depending on size and length.

The orifice pattern described provides more steam at the proximal end of liner 101 and ensures good mixing even if hose 112 becomes twisted. This also insures that steam is injected into any condensate that forms in the pipe invert to cure that portion of the resin in the liner covered by the condensate pool. Steam is provided from a steam inlet hose that is regulated by a valve manifold. The steam flow is adjusted to maintain a curing pressure of about 3-6 psi until cure cycle is complete.

In a typical installation, orifices in lay flat hose 112 are formed about one foot apart when a four inch hose is folded and cut in an alternating pattern about one-half inch in from the top and bottom of the folded tube. Thus, two holes are formed at each location so that the two holes are formed in an alternating pattern. Lay flat hose 86 has a closed distal end and may range in size from about 2 to 8 inches in diameter. The diameter of the orifices range from about $\frac{1}{8}$ to $\frac{1}{2}$ inch, and preferably between about $\frac{3}{16}$ to $\frac{3}{8}$ inch in diameter. Depending on the particular resin selected, one having high exotherm during cure may only require smaller orifices as less steam is require to complete the cure. In some systems, more that one perforated lay flat hose may be used.

At the same time exhaust port 130 is being installed, a steam elbow or a flexible layflat adapter 113 is attached to the proximal end of lay flat hose 112 above entry opening 13. Elbow 113 and excess lay flat hose 112 are lowered through first gland 16 and attached to capped air/steam port 108. As shown in FIG. 13, first gland 16 is then securely closed, and air/steam supply hose 109 is connected to steam inlet port 108 on liner 101 and second gland 21 is opened. At this time air and steam are introduced into air/steam inlet port 108 and fed through perforated lay flat hose to start warm up of liner 101. Once a 3° F. increase in temperature is detected at the distal end, full steam is applied to effect the cure. Exhaust steam exits through an exhaust hose connected to exhaust port 130 at the distal end of liner 101.

The installation procedure is as follows.

1. A wetout CIPP liner with a dry first end is turned inside out and fed through entry opening and secured to hooks. The liner is positioned through both glands into the manhole entry of conduit. An air hose is attached to the air inlet on the dry portion of the liner.

2. A 2" air supply hose is connected from exhaust end of air/steam manifold to air inlet on inversion unit. Air pressure and temperature gauges (1 ea) are connected to an air/steam manifold.

3. A hold back rope and perforated lay flat hose are connected to the other end of the CIPP liner.

4. A suitable lubricant is placed on the absorbent felt layers at the inlet to the enhancement sleeve placed in the dry portion of the liner.

The installation sequence as described in connection with FIGS. 4 though 8 is then followed.

As shown in FIGS. 14(a) and 14(b) a PVC or rigid pipe sample mold of metal with an exhaust pipe assembly 161 with a mold 162 and steel pipe 163 in the far manhole and align it to receive an inverting tube. As the inverting nose nears the far manhole, the inversion is slowed to allow the liner to enter sample mold 162 and steel pipe 163. The inversion is stopped when the nose of the inverting liner is about one diameter past the end of sample mold 162.

The hold back rope is tied off and the inverted liner is ported by inserting a steel-porting pipe 164 with a piercing point 166 at the lower end and a valve 167 at upper end. A flange or o-ring 168 is provided a point on porting pipe 164 to prevent pipe 164 from piercing the opposite side of the liner.

A crewmember who is responsible for porting notifies the inverting end that he is preparing to port the inverted liner so that they will be prepared to adjust the supply air to maintain pressure on the inverted liner once it has been ported.

Once the liner has been successfully ported, porting pipe valve 167 is closed and an exhaust hose with a valve at the far end is attached to porting pipe valve 167. Control of the exhaust is now at the far end of the exhaust hose.

At the completion of the inversion control of the exhaust is now at the far end of the exhaust hose. The exhaust valve and air inlet regulator are adjusted as required to maintain good flow and recommended heat up and cure pressure. Exhaust and condensate ports are installed as shown in FIGS. 11(*a*) to 11(*h*).

The boiler output is shut and the steam supply hose is attached to the air steam manifold. Warm-up is then started. The inner-face temperature at the 6 O'clock position in the far manhole is monitored. The warm-up steam air mixture should be about 180° F. and continue until there is a 3° F. increase at the interface in the far manhole. Once warm-up is completed, the amount of air in the air/steam mixture is slowly reduced to zero and full steam flow is maintained at 225 to 240° F. at the recommended cure pressure. Full steam cure is continued for between 1 to 4 hours as required depending on length and thickness of the liner as well as the surrounding environment.

Once the cure cycle is completed, steam is slowly shut off and air is simultaneously added to maintain the recommended cure pressure. The liner is then cooled down for a minimum of 15 minutes or until the interface temperature is 130° F. at the far end, whichever is longer.

Steam supply is then shut off at the boiler. When boiler supply hose pressure reaches zero, the steam supply hose is disconnected. When cool down is complete, the air compressor is shut off and pressure in air hose is released and air supply hose is disconnected.

At this time, the ends are removed from the lined pipe and services reinstalled using standard procedures.

The flexible cured in place liner is of the type generally well known in the art. It is formed from at least one layer of a flexible resin impregnable material, such as a felt layer having an outer impermeable polymer film layer. The felt layer and film layer are stitched along a seam line to form a tubular liner. A compatible thermoplastic film in a form of a tape or extruded material is placed on or extruded over seam line in order to ensure the impermeability of the liner.

For larger liner diameters, several layers of felt material may be used. The felt layers may be natural or synthetic flexible resin absorbable materials, such as polyester or acrylic fibers. The impermeable film outer layer may be a suitable polyolefin, such as polypropylene, or other high performance polymer that can withstand steam temperatures as are well known in the art. In the initial step in all trenchless rehabilitation installations, the existing pipeline is prepared by cleaning and videotaping.

Prior to commencing installation pursuant to the method in accordance with the invention, a curable thermosetting resin is impregnated into the felt of a liner by a process referred to as "wet-out." The wet-out process generally involves injecting resin into the felt layer through the end or an opening formed in the impermeable film layer, drawing a vacuum and passing the impregnated liner through nip rollers as is well known in the lining art. One such procedure of this vacuum impregnation is described in Insituform U.S. Pat. No. 4,366,012, the contents of which are incorporated herein by reference. A wide variety of resins may be used, such as polyester, vinyl esters, epoxy resins and the like, which may be modified as desired. It is preferable to utilize a resin that is relatively stable at room temperature, but which cures readily when heated.

The air inversion and steam cure installation of Cured In Place Pipe (CIPP) liners described herein is a cost effective and efficient method for installing and curing medium to large diameter (18"-84") liners. Use of steam to cure without deflating the inverted liner requires procedures that differ greatly from the more typical hot water cure of these same diameter CIPP liners. The use of steam cure for medium and large diameter CIPP liners also requires different technology than that used for steam cure of small diameter (6"-15") CIPP liners.

When properly used, steam is a much more environmentally friendly cure method than water in that it uses only about 5% of the water and between about 15 to 30% of the energy that would be used in a hot water cure. Earlier attempts to extend the use of steam cure of CIPP liners to diameters 18" and above have often resulted in incomplete cure of the lower portion of the installed CIPP liner. Attempts at overcoming this cure problem by using large volumes of steam and/or steam and air have been only marginally successful. In addition, introduction of large volumes of steam tend to extend cure cycle time and increased energy usage. Even with the extended cure cycle and additional energy, effective cure under certain field conditions is difficult to achieve. It is believed that this has been due to thermal stratification and the presence of areas of condensation that collects in low sections of the pipe and curing liner. The collected condensate insulates and prevents heat transfer to the resin laminate from the steam blanket above.

Hot water cure of medium to large diameter CIPP liners typically requires between approximately 1500 to 2500 BTUs per pound of resin cured. In contrast, small diameter steam cured liners (6"-12") require about 700 to 1000 BTUs per pound of resin cured.

The methods described consistently achieve a complete CIPP cure with about 300 to 500 BTUs per pound of resin even with areas of ponded condensate present in the bottom of the CIPP liner. This is possible because of the use of a steam injection method that controls the steam injection locations to eliminate thermal stratification and the adverse effect on cure of ponded condensate. The method also controls the quantity and location of steam injection along the length of the CIPP liner to maximize the heat transfer from each pound of steam to the resin felt laminate before it is exhausted from the far end of the CIPP liner as condensate or water vapor.

As described herein, steam is injected into a closed end hose, which lays in the invert of the expanded CIPP liner. An independent exhaust port(s) with a control valve is provided to control the exhaust of water vapor and condensate from the distal end of the CIPP liner. The hose contains a number of orifices of appropriate size and spacing for the size, thickness and length of the installation along the full length of the hose. The location of the orifices around the hose circumference are designed so that regardless of hose orientation during placement in the CIPP liner, a number of orifices along the length of the hose will be directed toward the bottom of the CIPP liner. This creates a continuous injection of steam into any ponded condensate through out the cure cycle. The steam injected into the condensate heats the condensate above the temperature necessary to insure cure.

The closed end on the steam injection hose allows the injected hose internal pressure to be higher than the internal cure pressure of the CIPP liner. As the injected steam moves through the length of the hose it is forced out through the orifices forming a steam blanket within the CIPP liner. The differential between the internal pressure of the steam injection hose and the CIPP internal pressure lessens as the steam move away from the injection end of the steam injection hose. Therefore, the volume of steam injected from each orifice decreases along the length of the steam injection hose.

This accomplishes three things:
1. Increase in the residence time that the majority of the steam is available inside the CIPP liner to maximize energy transfer to the resin felt laminate.
2. Continually adds additional energy to the steam blanket as it moves toward the exhaust end of the CIPP liner keeping the rate of energy transfer higher.
3. The steam injection into the steam blanket also causes turbulence, which eliminates thermal stratification, and increases energy transfer.

Knowing the physical properties of the CIPP liner (diameter, length, thickness, resin and catalyst system) and available boiler output in BTUs per hour permits the adjustment of orifice size to match boiler output in pounds of steam per hour with recommended cure cycle time.

It can readily be seen that the process in accordance with the invention readily allows one to attain the advantage of curing a resin liner with flow through steam. By practicing the process, a tubular member can be easily inverted through an existing pipeline. Providing an apparatus having two rigid glands allows an inverting liner to be installed with a hold back strap and lay flat hose. Use of gap setting devices to maintain the gap at the second gland allows for increasing eversion pressure to be applied to the complete profile of the liner without increasing the gland pressure on the inverting liner. Steam is then passed into the inverted liner to utilize the higher energy available in the steam that significantly shortens the cure cycle when compared to hot water cure.

It will thus be seen that the objects set fort above, among those made apparent from the preceding description, are efficiently attained and, since certain changes may be made and in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A method for inverting a liner into an existing conduit, comprising:
   placing a flexible tubular liner into an installation apparatus having a first gland and a second gland downstream and spaced apart from the first gland;
   securing an end of the liner to the apparatus upstream of the first gland;
   inverting the liner through the apparatus past at least one gland;
   positioning a fluid inlet port in the inverted portion of the liner downstream of the at least one gland;
   closing one of the glands with the fluid inlet port on the downstream side thereof;
   introducing a pressurized inversion fluid into the inverted portion of the liner through the fluid inlet port; and
   allowing the liner to invert in response to the fluid introduced through the fluid inlet port,
   wherein the fluid inlet port is a first fluid inlet port, the method further including positioning the first fluid inlet port in the inverted liner downstream of the second gland and positioning a second fluid inlet port between the two glands.

2. The method of claim 1, wherein the inlet port is installed prior to securing the liner to the apparatus.

3. The method of claim 1, wherein a portion of the liner is inverted prior to being placed into the apparatus.

4. A method as set forth in claim 1 wherein the liner comprises a resin impregnated therein and wherein allowing the liner to invert comprises inverting the liner from a first access point of an existing pipeline to a second access point of the pipeline by introducing the pressurized inversion fluid into the liner through the first fluid inlet port while the second gland is closed, the method further comprising:
   closing the first gland;
   opening the second gland; and
   introducing a curing fluid into the inverted liner through the second fluid inlet port to cure the resin in the liner.

5. The method of claim 4, further comprising
   attaching a hold back strap to an end of the liner opposite the end that is secured to the installation apparatus,
   wherein closing the first gland comprises engaging the hold back strap with the first gland.

6. The method of claim 5, including attaching an end of a lay flat hose to the same end of the liner as the hold back strap.

7. The method of claim 6, wherein the end of the lay flat hose that is attached to the liner is closed.

8. The method of claim 6, including attaching the lay flat hose to the second fluid inlet port.

9. The method of claim 8, wherein attaching the lay flat hose to the second fluid inlet port includes:
   cutting the lay flat hose upstream from the second gland;
   attaching one end of an elbow to the cut end of the lay flat hose; and
   attaching the other end of the elbow to the second fluid inlet port.

10. The method of claim 8, wherein attaching the lay flat hose to the second fluid inlet port, includes:
   cutting the lay flat hose upstream from the second gland;
   feeding the cut end of the cut end of the lay flat hose through the second fluid inlet port;
   inserting a relatively stiff bendable tubular rigid sleeve with a flared end into the cut end of the lay flay hose to make the cut end of the lay flat hose resistant to kinking;
   banding the lay flat hose to the tubular portion of the sleeve; and
   inserting the lay flat hose and tubular portion of the sleeve into the second fluid inlet port so the flared end of the sleeve prevents the sleeve from being pulled into the liner through the second fluid inlet port.

11. The method of claim 6, wherein the lay flat hose is perforated along its length to distribute curing fluid along the length of the interior of the inverted liner.

12. The method of claim 6, wherein closing the first gland comprises closing the first gland after a connection connecting the lay flat hose and hold back strap to the liner passes therethrough and opening the second gland comprises allowing the connection to pass through the second gland while it is open.

13. The method of claim 1, including the step of forming an exhaust port in the liner at the downstream end of the inverted liner after the inversion is complete without allowing the inverted liner to deflate.

14. The method of claim 4, wherein the inversion fluid is air and the curing fluid is steam.

15. A method for inverting a liner into an existing conduit, comprising:

placing a flexible tubular liner into an installation apparatus having a first gland and a second gland downstream and spaced apart from the first gland;

securing an end of the liner to the apparatus upstream of the first gland;

inverting the liner through the apparatus past at least one gland;

positioning a fluid inlet port in the inverted portion of the liner downstream of the at least one gland;

closing one of the glands with the fluid inlet port on the downstream side thereof;

introducing a pressurized inversion fluid into the inverted portion of the liner through the fluid inlet port;

allowing the liner to invert in response to the fluid introduced through the fluid inlet port; and forming an exhaust port in the liner at the downstream end of the inverted liner after the inversion is complete without allowing the inverted liner to deflate.

* * * * *